United States Patent
Bourlas et al.

(10) Patent No.: US 9,143,585 B2
(45) Date of Patent: Sep. 22, 2015

(54) METHOD AND SYSTEM FOR GENERIC MULTIPROTOCOL CONVERGENCE OVER WIRELESS AIR INTERFACE

(75) Inventors: Yair Bourlas, San Diego, CA (US); Lei Wang, San Diego, CA (US); Brian D. Petry, San Diego, CA (US)

(73) Assignee: Wi-LAN Inc., Ottawa, ON (CA)

( * ) Notice: Subject to any disclaimer, the term of this patent is extended or adjusted under 35 U.S.C. 154(b) by 863 days.

(21) Appl. No.: 11/482,495

(22) Filed: Jul. 7, 2006

(65) Prior Publication Data

US 2008/0008159 A1 Jan. 10, 2008

(51) Int. Cl.
| H04L 29/08 | (2006.01) |
| H04L 29/06 | (2006.01) |
| H04W 80/04 | (2009.01) |
| H04W 4/18 | (2009.01) |
| H04W 8/26 | (2009.01) |
| H04W 28/06 | (2009.01) |
| H04W 72/12 | (2009.01) |
| H04W 88/10 | (2009.01) |

(52) U.S. Cl.
CPC ............... *H04L 69/32* (2013.01); *H04L 63/164* (2013.01); *H04W 4/18* (2013.01); *H04W 8/26* (2013.01); *H04W 28/065* (2013.01); *H04W 72/1242* (2013.01); *H04W 80/045* (2013.01); *H04W 88/10* (2013.01)

(58) Field of Classification Search
CPC .......... H04W 28/065; H04W 72/1242; H04W 88/10; H04W 80/02; H04W 80/045; H04L 63/164; H04L 69/32
USPC ......... 370/280, 338, 312, 358, 208, 465, 466; 709/224
See application file for complete search history.

(56) References Cited

U.S. PATENT DOCUMENTS

| 6,459,687 B1 | 10/2002 | Bourlas et al. |
| 6,590,882 B1 | 7/2003 | Fong et al. |

(Continued)

FOREIGN PATENT DOCUMENTS

| EP | 1 089 500 | 4/2001 |
| EP | 1089500 | 4/2001 |

(Continued)

OTHER PUBLICATIONS

L Wang et al., A Generic Packet Convergence Sublayer (GPCS) for supporting multiple protocol over 802.16 Air interface, Nov. 17, 2005.*

(Continued)

*Primary Examiner* — Nizar Sivji
(74) *Attorney, Agent, or Firm* — Volpe and Koenig, P.C.

(57) ABSTRACT

Data packets of multiple different protocols are transmitted over a broadband wireless air interface between network stations subscribing to the broadband wireless access service. A first network station receives data packets of different network protocols in an upper layer for transmission to a second station over the wireless air interface. The different protocol data packets are processed in the upper layer to look up a destination address and class of service, and are transmitted to a single generic packet convergence sublayer along with an identification tag indicating the destination address and class of service. The generic packet convergence sublayer maps the identification tag to a single connection ID (CID) of a second station of the broadband wireless access service, without having to carry out any packet inspection.

21 Claims, 12 Drawing Sheets

(56) References Cited

U.S. PATENT DOCUMENTS

| | | | |
|---|---|---|---|
| 6,931,569 B2 | 8/2005 | Fong et al. | |
| 2002/0136170 A1 | 9/2002 | Struhsaker | |
| 2003/0103525 A1 | 6/2003 | Wahl | |
| 2003/0212830 A1 | 11/2003 | Greenblat et al. | |
| 2006/0007854 A1* | 1/2006 | Yu | 370/229 |
| 2006/0039313 A1 | 2/2006 | Chou et al. | |

FOREIGN PATENT DOCUMENTS

| | | |
|---|---|---|
| EP | 1 484 897 | 8/2004 |
| EP | 1484897 | 8/2004 |

OTHER PUBLICATIONS 802.16 Standard for Local and Metropolitan Area Networks —part 16 Air interface for Fixed broadband wireless access system (pp. 1-30), IEEE Standard Oct. 1, 2004.*

Davies, E. et al., "Multiple Encapsulation Methods Considered Harmful", pp. 1-16, May 16, 2006; Retrieved from the internet: http://tools.ietf.org/html/draft-iab-link-encaps-00.

IEEE Standard for Local and metropolitan area networks, Part 16: Air Interface for Fixed Broadband Wireless Access Systems, IEEE Std 802.16-/2004 (Oct. 1, 2004).

Bourlas et al., "A Generic Packet Convergence Sublayer for Supporting Multiple Protocols over 802.16 Air Interface," IEEE 802.16 Broadband Wireless Access Working Group, IEEE C802.16g-05/025 (Jul. 11, 2005).

Davies et al., "Multiple Encapsulation Methods Considered Harmful," pp. 1-16 (May 16, 2006) *available at* http://tools.ietf.org/html/draft-iab-link-encaps-00.

IEE Standard for Local and metropolitan area networks, Part 16: Air Interface for Fixed and Mobile Broadband Wireless Access Systems Amendment 2: Physical and Medium Access Control Layers for Combined Fixed and Mobile Operation in Licensed Bands, and Corrigendum 1, IEE Std 802.16e-2005 and IEE Std. 802.16-2004/Corl-2005 (Feb. 28, 2006).

IEEE Standard for Local and metropolitan area networks, Part 16: Air Interface for Fixed Broadband Wireless Access Systems, IEEE Std 802.16-2004 (Oct. 1, 2004).

International Search Report/Written Opinion issued in PCT/US2007/071472 on May 19, 2005.

Petry, "A Generic Packet Convergence Sublayer (GBCS) for Supporting Multiple Protocols Over 802.16 Air Interface,"IEEE 802.16 Session #40, IEEE S 802.16g-05/025rl (Nov. 15, 2005).

Wang et al., " A Generic Packet Convergence Sublayer (GPCS) for Supporting Multiple Protocols over 802.16 Air Interface."IEEE 802.16 Broadband Wireless Access Working Group, IEEE C 802.16g-05/025r2 (Nov. 1, 2005).

Wang et al., "A Generic Packet Convergence Sublayer (GPCS) for Supporting Multiple Protocols over 802.16 Air Interface." IEEE 802.16 Broadband Wireless Access Working Group, IEEE C 802.16g-05/025r1 (Nov. 9, 2005).

Wang et al., "A Generic Packet Convergence Sublayer (GPCS) for Supporting Multiple Protocols over 802.16 Air Interface." IEEE 802.16 Broadband Wireless Access Working Group, IEEE C 802.16g-05/025r3 (Nov. 16, 2005).

Wang et al., "A Generic Packet Convergence Sublayer (GPCS) for Supporting Multiple Protocols over 802.16 Air Interface." IEEE 802.16 Broadband Wireless Access Working Group, IEEE C 802.16g-05/025r4 (Nov. 17, 2005).

* cited by examiner

METHOD AND SYSTEM FOR GENERIC MULTIPROTOCOL CONVERGENCE OVER WIRELESS AIR INTERFACE

BACKGROUND

1. Field of the Invention

The present disclosure relates generally to broadband wireless access and is concerned with protocol schemes for enabling communications among network stations over a broadband wireless air interface in various network topologies, e.g., point-to-point, point-to-multipoint, relay, mesh, and others.

2. Related Art

Broadband wireless access has been developed to meet increasing demand for rapid Internet connection as well as for integrated data, voice, and video services. Networks can be created using broadband wireless technology by deploying a number of base stations (BS) at spaced intervals over an area to be covered by the network, creating high capacity wireless access systems. A wireless air interface can be provided between each subscriber station and a base station to provide a communication path from the subscriber to multiple core networks to which the interface is providing access. One problem with broadband wireless networks is the lack of a universal standard for communication via the wireless air interface (first mile/last mile connection), to allow communication of data packets to and from the different core networks involved. The Institute of Electrical and Electronics Engineers ("IEEE") Standard 802.16 for a wireless air interface IEEE Standard 802.16 is one example of a standard protocol for the air interface for a wireless metropolitan area network.

One requirement of a broadband wireless air interface, such as an IEEE 802.16 interface, is the ability to transport multiple protocol types, such as Internet Protocol versions 4 and 6 ("IPv4", "IPv6"), Ethernet, 802.1Q/VLAN, and the like. It must also be capable of extension to transport new protocols which have yet to be developed over the air interface.

SUMMARY

This disclosure is concerned with providing a method and system for operating a broadband wireless air interface network station, such as a base station or subscriber station, such that data packets of multiple different protocols can be transmitted and received over one or more broadband wireless air interfaces.

In one embodiment of the present disclosure, a method of operating a network station to receive and transmit data packets of one or more different protocols over one or more broadband wireless air interfaces is provided, which comprises the steps of receiving data packets in an upper layer module, inspecting each data packet in the upper layer module to deter-mine a broadband wireless air interface, destination address and a transmission priority associated with the data packet, associating an identification tag with each data packet indicating the determined destination address and transmission priority, passing each data packet and associated identification tag from the upper layer module to a generic packet convergence sublayer (GPCS) module, mapping the identification tag of each data packet to an associated broadband wireless connection identifier (CID), which identifies one of multiple flows of data over the broadband wireless interface, each flow having a certain common behavior), passing each data packet and associated CID from the GPCS module to a media access control (MAC) module, scheduling the order of transmission of data packets based at least on the respective priority parameters of the CID associated with each packet; and transmitting each data packet over a broadband wireless air interface to the destination network station in the order determined by the MAC module.

The same method is used by base stations and subscriber stations for transmitting and receiving data packets over broadband wireless air interfaces linking the base station and subscriber stations. The broadband wireless air interfaces may be IEEE 802.16 standard wireless air interfaces or other types of broadband wireless air interfaces for connecting data between various core networks and subscriber stations. In one example, the term "broadband wireless air interface" as used herein covers a group of broadband wireless air interfaces of which IEEE 802.16 is an example, and may include wireless air interface which support differentiated quality of service or "QoS". In one example, a broadband wireless air interface may be capable of operating over a wide range of frequencies over channels of varying sizes and has on-demand bandwidth allocation.

The same method may be used both at the base stations and at the mobile or fixed subscriber stations using the broadband wireless air interface for access to various network services, which may include Internet, phone, Voice over Internet Protocol (VoIP), Ethernet, and the like. Each base station may be linked by a broadband wireless air interface to a plurality of fixed and/or mobile subscriber stations, and schedules incoming data packets from different core network protocols for transmission over the respective air interfaces to the subscriber stations to which the data packets are addressed. Each subscriber station in turn uses the same method to transmit different protocol data packets to the associated base station over the wireless air interface, for subsequent transmission to other addresses via the core network. The MAC module coordinates transmission of data at the transmitter side and reception of data at the receiver side, and sorts the data for downlink according to source and/or destination addresses, ports, QoS and traffic parameters, such as priority and the class of service (CoS) associated with the respective transport connection ID (CID).

In this method, data packet inspection and interpretation to locate and extract fields needed to classify a destination address and class of service for a respective data packet is carried out above or prior to the packet reaching the GPCS module. A tag associated with each packet passed to the GPCS module identifies the destination and class of service, so no packet inspection occurs in this module. Instead, the GPCS module simply classifies or maps the identification tag to an associated transport connection ID (CID) of the broadband wireless service, and sends the data packet and CID to the MAC module, which identifies the class of service and thus the priority for transmission of the data packet from the CID.

This method permits data packets of different protocol types to be carried over the same GPCS module to and from the MAC module. In one embodiment, data packets of different protocol types are received at protocol specific inputs and are connected to protocol specific interface modules. Each protocol specific interface module inspects data packets received from the associated input to determine the destination and class of service (for example as part of a route lookup and classification operation), and associates a corresponding identification tag to the data packet. The data packets and associated identification tags are then provided over respective connections to the GPCS module.

In another embodiment, all received data packets are inspected in a single, multiple protocol module which associates a logical flow identification tag identifying the destination (choice among multiple broadband wireless interfaces and selection of receiving station) and the class of service with each data packet, and also associates a protocol type identification with each data packet. Each data packet and associated logical flow ID and protocol type ID tag is passed over a single connection to the GPCS module. The GPCS module associates the logical flow ID tag with a CID before passing the data packet and associated CID to the MAC module. In one embodiment, a protocol type identifier is added to the data packet at the GPCS layer. Alternatively, the protocol type identifier may be added in the upper layer. The protocol type identifier allows the receiving station to deliver the data packet to the appropriate module for that service protocol at the receiving station.

According to another aspect of the present disclosure, a network station for receiving and transmitting data over a broadband wireless access interface is provided, comprising a backhaul input/output module for communication over one or more wireless or wired backhaul networks, a broadband wireless interface input/output module for communication over at least one broadband wireless interface; and a processor connected between the input/output modules for processing data packets of multiple different protocols received at the backhaul input/output module for transmission over the broadband wireless air interface and for processing data packets received at the broadband wireless interface input/output module for transmission over the associated backhaul network. The processor has an upper layer module connected to the backhaul input/output module, a generic packet convergence sublayer (GPCS) module linked to the upper layer module, and a media access control (MAC) module linked to the GPCS module and to the broadband wireless interface input/output module. The MAC module may be linked to the broadband wireless interface input/output module via a physical layer (PHY) module.

The upper layer module may have a first layer of network modules for receiving data packets in a plurality of different network protocols, and a second layer configured to inspect each data packet in the upper layer module to determine a service path over a broadband wireless interface to a destination network station identified in the data packet, to inspect each data packet to determine a class of service (CoS) associated with the data packet, and to associate an identification tag with each data packet. In one embodiment, the Identification tag indicates the determined service path and the class of service (CoS), QoS and traffic parameters associated with the data packet.

The second layer may comprise a plurality of interface modules each assigned to a respective network protocol and configured to inspect data packets in that specific network protocol and to create an associated identification tag before passing the data packet and associated identification tag to the GPCS module. The modules may include an internet (IP) to wireless air interface module, an Ethernet to wireless air interface module, an 802.1D bridge to wireless air interface module, and the like.

In another embodiment, the second layer comprises a multiple protocol interface module, either in addition to or instead of the protocol or service specific interface modules. The multiple protocol interface module can be used to support multiple protocols over a single MAC connection of the wireless air interface protocol. A multiple protocol enable switch may be provided so that a local system can choose to activate the multiple protocol interface to enable multiple protocols to be carried over a single connection to the GPCS service access point (SAP). This is useful for devices that are constrained to implement a small number of connections but need to carry a variety of protocols which can use the same set of transmission rules indicated by a CID. The set of rules is sometimes known as "scheduling service type."

The multiple protocol interface module is configured to inspect each data packet received from the upper layer to identify its associated logical flow identification tag. In addition, the multiple protocol interface module may be configured to associate a protocol type identification tag to the data packet. The data packets with protocol type identification tag and associated logical flow are then passed to the GPCS module. Thus, in this case, a single data transport connection is provided to transport multiple protocol data traffic, whereas the protocol specific interfaces have separate connections for specific upper layer protocols.

The GPCS module is configured to map the identification tag of each data packet to an associated broadband wireless connection ID (CID) and to pass each data packet and associated CID to the media access control (MAC) module. The MAC module is configured to schedule the order of transmission of data packets based on the respective QoS parameters and traffic parameters of the CID associated with each packet; and to transmit each data packet over a broadband wireless air interface to the associated destination network station in the order determined by the MAC module based on QoS parameters and traffic parameters. When the multiple protocol interface module is activated, a protocol type identifier is further added to the data packet at a selected location, indicating the protocol of the data packet, such as Ethernet, IPv4, IPv6, or the like, and to pass the resultant packet, known as service data unit (SDU) in IEEE802.16, to the MAC module. The protocol type identifier may be added as a header, a trailer, or at a selected location in the packet, and may be added by the upper layer or by the GPCS module. When the multiprotocol module is not activated, or a single upper protocol type is bound to a single connection, insertion of a protocol type identifier into the packet is not necessary.

The network station or node may be a base station or a subscriber station which may be a fixed or mobile subscriber station. A subscriber station which has a service agreement with multiple different networks, such as Internet providers, Ethernet, television service, phone service providers, and the like, can communicate with multiple different service providers over the same broadband wireless access link using the communication system and method of this disclosure.

Other features and advantages of the present disclosure will become more readily apparent to those of ordinary skill in the art after reviewing the following detailed description and accompanying drawings.

BRIEF DESCRIPTION OF THE DRAWINGS

The details of the present disclosure, both as to its structure and operation, may be gleaned in part by study of the accompanying drawings, in which like reference numerals refer to like parts, and in which.

DETAILED DESCRIPTION

Certain embodiments as disclosed herein provide for methods and systems for communication between the nodes in a packet data network over a broadband wireless air interface. After reading this description it will become apparent to one skilled in the art how to implement the present disclosure in various alternative embodiments and alternative applications. However, although various embodiments of the present disclosure will be described herein, it is understood that these embodiments are presented by way of example only, and not limitation. As such, this detailed description of various alternative embodiments should not be construed to limit the scope or breadth of the present disclosure as set forth in the appended claims.

Figure 1:
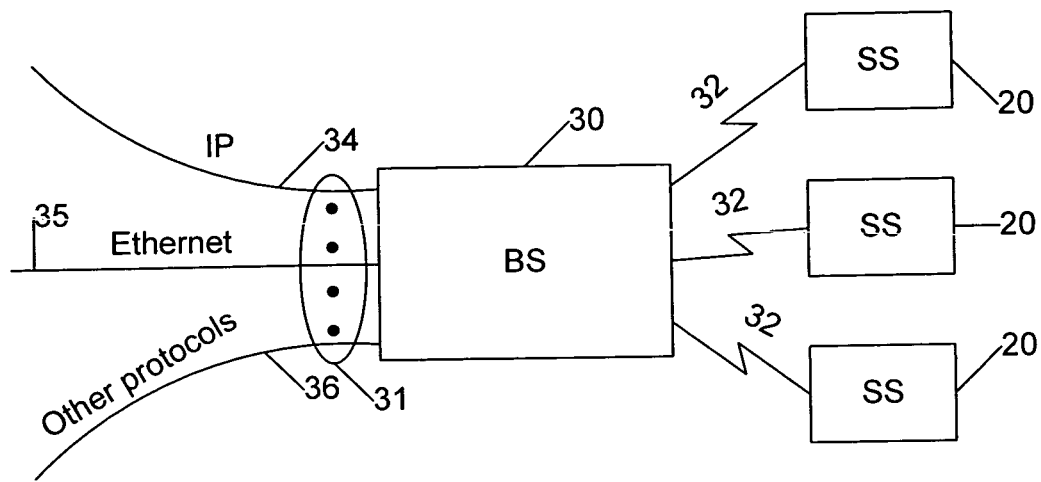
FIG. 1 is a high level block diagram illustrating part of a wireless communication system in which data communication to and from one or more subscriber stations is provided over a broadband wireless air link.
Figure 12:
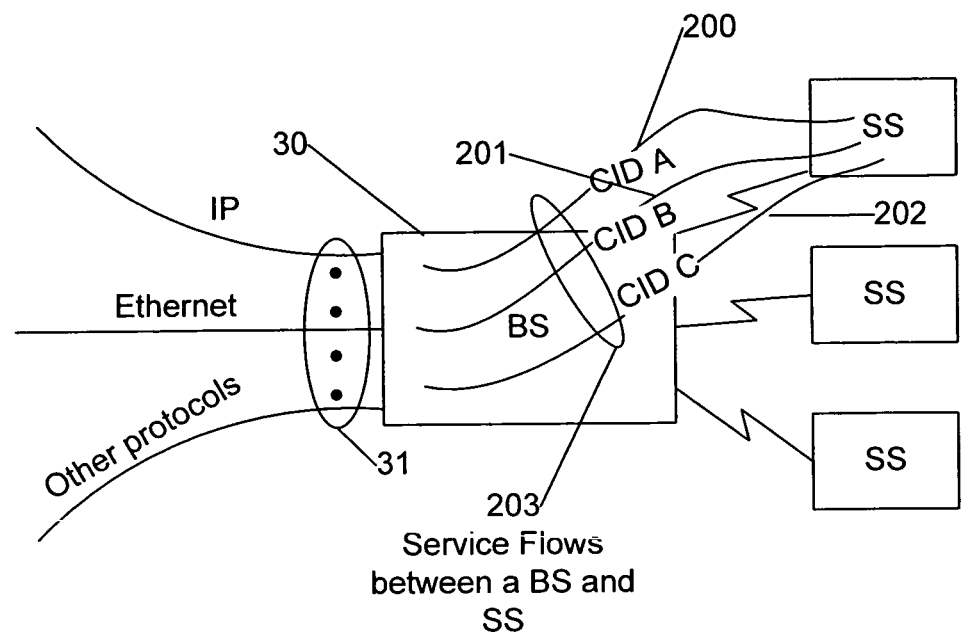
FIG. 12 is a high level diagram, similar to FIG. 1, which shows service flows between a base station and subscriber station, each identified by a connection ID (CID).

FIG. 1 of the drawings is a high level block diagram illustrating part of a communication network having a plurality of subscriber stations or end point nodes ("SS") 20 which can communicate with a base station or intermediate node ("BS") 30 of the network over a broadband wireless air ("BWA") interface 32 for access to various public or other networks, such as the Internet, telephone network, digital television, and the like. Each SS 20 communicates with BS 30 over a BWA interface 32. There may be more than one service flow from BS 30 to a particular SS 20. FIG. 12 depicts three such service flows, 200, 201 and 202, between a BS and SS. The BS 30 in turn communicates with one or more networks using a communication link or "backhaul" 31.

The broadband wireless air interface may be an Institute of Electrical and Electronics Engineers ("IEEE") Standard 802.16 air interface, but it will be understood by those skilled in the field that other broadband wireless standard air interfaces may be used in the embodiments described below, and that the same protocol layering principals used in connection with the described embodiments would apply to a wireless air interface of any other broadband wireless access (BWA) system. In one embodiment, the term "broadband wireless air interface" is any wireless air interface service which supports differentiated class of service (CoS), as may exist to varying degrees in other known wireless air interfaces such as 802.11 and WLANS. In one embodiment, a broadband wireless air interface generally has a on-demand bandwidth allocation.

In FIG. 1, several subscriber stations 20 are within the coverage area of BS 30, and it will be understood that a plurality of base stations may be provided at suitable locations over the entire area to be covered by various protocol networks for communication with the subscriber stations via broadband wireless air interfaces in order to provide for so-called "first mile/last mile" connection without having to use wire or cable links.

Communications between each base station 30 and the associated subscriber stations 20 (which may be fixed or mobile subscriber stations) over wireless air interfaces 32 use protocols of the broadband wireless network, such as IEEE 802.16 standard protocols. The wireless service provides broadband wireless air access between the subscriber station and selected networks, such as a public telephone network, the Internet, and the like. Base stations 30 are capable of receiving packets from different networks using other standard protocols and transmitting such packets over a wireless air interface or link 32 to the designated subscriber station to which the packets are addressed, as well as sending data packets from subscriber stations to users in other networks. As schematically indicated in FIG. 1, BS 30 may receive packets over the backhaul which are in various protocol types such as Internet Protocol ("IP") 34, Ethernet protocol 35, or any other current or future standard protocol 36, and also receives packets in different protocol types over the broadband wireless air interfaces 32 to direct to the appropriate input/output connection in the backhaul 31.

Figure 2:
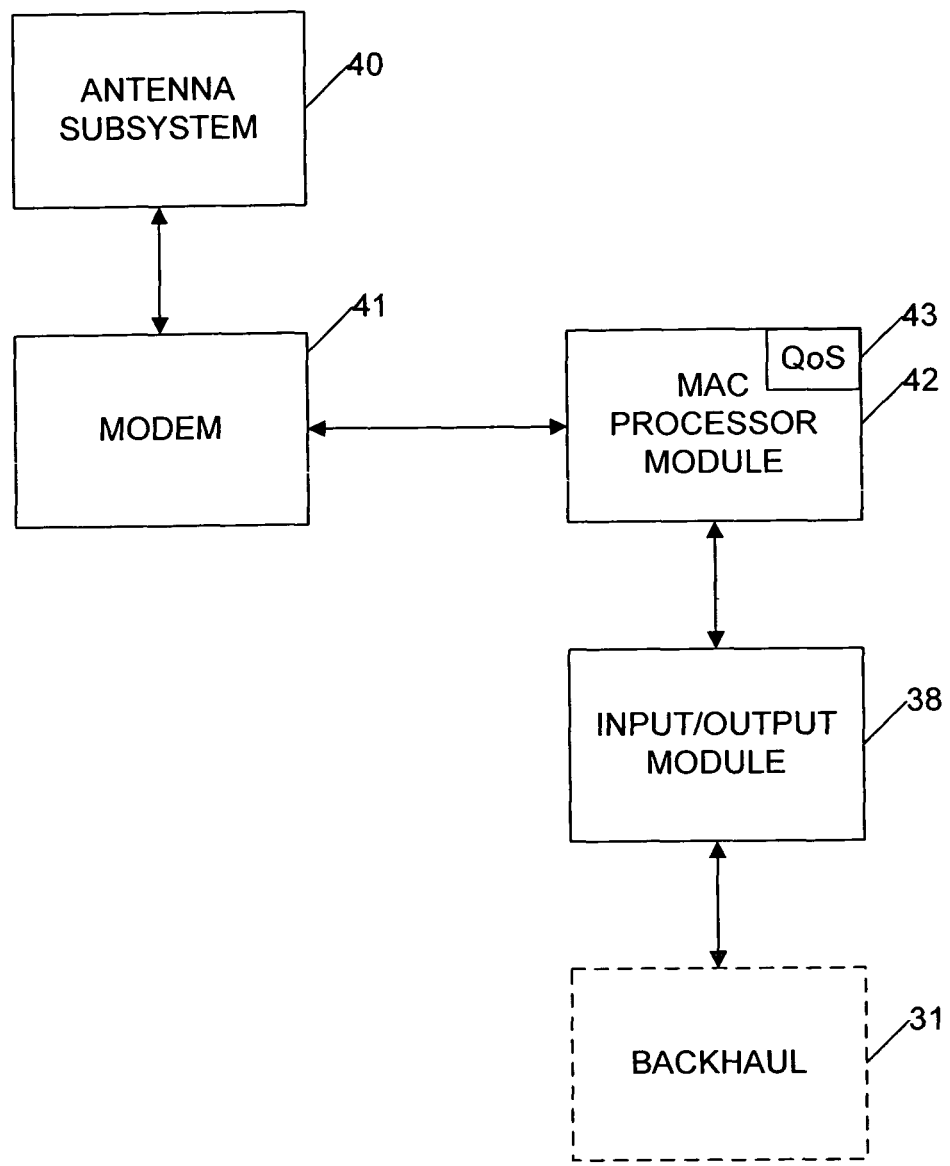
FIG. 2 is a high level block diagram of a base station or subscriber station of FIG. 1.

FIG. 2 is a high level block diagram of a control system within the base station 30 for managing incoming data packets over the backhaul 31 which are addressed to subscriber stations 20 associated with the base station 30 (downlink), and incoming data packets over the BWA interfaces 32 (uplink) for transmission over the backhaul to the appropriate network addresses. The base station is responsible for directing each packet along an appropriate service flow in the downlink to the appropriate connection of the associated subscriber station to which the packet is addressed, and for receiving packets from subscriber stations in the uplink and appropriately directing them through the backhaul 31. FIG. 12 depicts three such service flows, 200, 201 and 202, between BS and SS. Using IEEE 802.16 terminology, each service flow has a single connection and is identified by a connection ID. Each subscriber station may have similar circuitry for controlling direction of the packets received over the BWA interface 32 to the appropriate internal network device, and for controlling transmission of packets to the associated base station over the BWA interface in the uplink.

The system illustrated in FIG. 2 controls an antenna subsystem 40 of a network station or node. The antenna system may be a single antenna or may be comprised of multiple antennae or an antenna array for enabling advanced antenna system features such as beam forming or MIMO. It will be understood that a base station can have more than one antenna subsystem for communication with subscriber stations within different sectors or on different RF channels of the cell serviced by the base station, and similar circuitry may be associated with each antenna subsystem. A subscriber station may have one or more antennae and associated control circuitry comprising an antenna subsystem. The backhaul 31 may comprise wire and/or wireless links to an input/output module 38, as illustrated in FIG. 2. Each network protocol on the backhaul is associated with a particular input/output connection in module 38. As illustrated in FIG. 2, the input/output module 38 is connected to MAC (media access control) processor module 42. The MAC processor module communicates with antenna 40 through modem module 41. The modules illustrated in FIG. 2 may be provided in a single unit or may be provided in separate units in the base station.

Modem module 41 modulates packet data from the MAC processor 42 for transmission by antenna subsystem 40, and demodulates signals from the antenna subsystem 40 for transmission of packet data to the MAC processor module.

The MAC processor module 42 is responsible for scheduling and coordinating the transmission of data packets received at the backhaul over the associated BWA interfaces 32 as well as receiving of data packets from the base stations over the BWA interfaces 32 and directing such packets out over the backhaul 31 in the appropriate service flows. The MAC processor module allocates uplink and downlink bandwidth based on various parameters, some of which, such as priority, determine the quality of service (QoS) associated with the connection to which each data packet is addressed. Other parameters describe certain traffic characteristics of the connection, such as maximum data rate. Each subscriber station may have a plurality of end user connections for various different broadband services having different QoS requirements. Each end user connection is assigned its own, unique connection ID (CID). Module 42 has a quality of service or QoS module 43. The QoS module determines the QoS and traffic parameters of the connection or CID to which each data packet is directed, and uses this information to determine the priority or order of data packet transmission. Incoming data packets are stored in a buffer in the MAC processor module and sorted and packed for transmission in data bursts based on QoS priorities as determined by the QoS module, as well as other factors, such as fairness between the subscriber stations.

Figure 3:
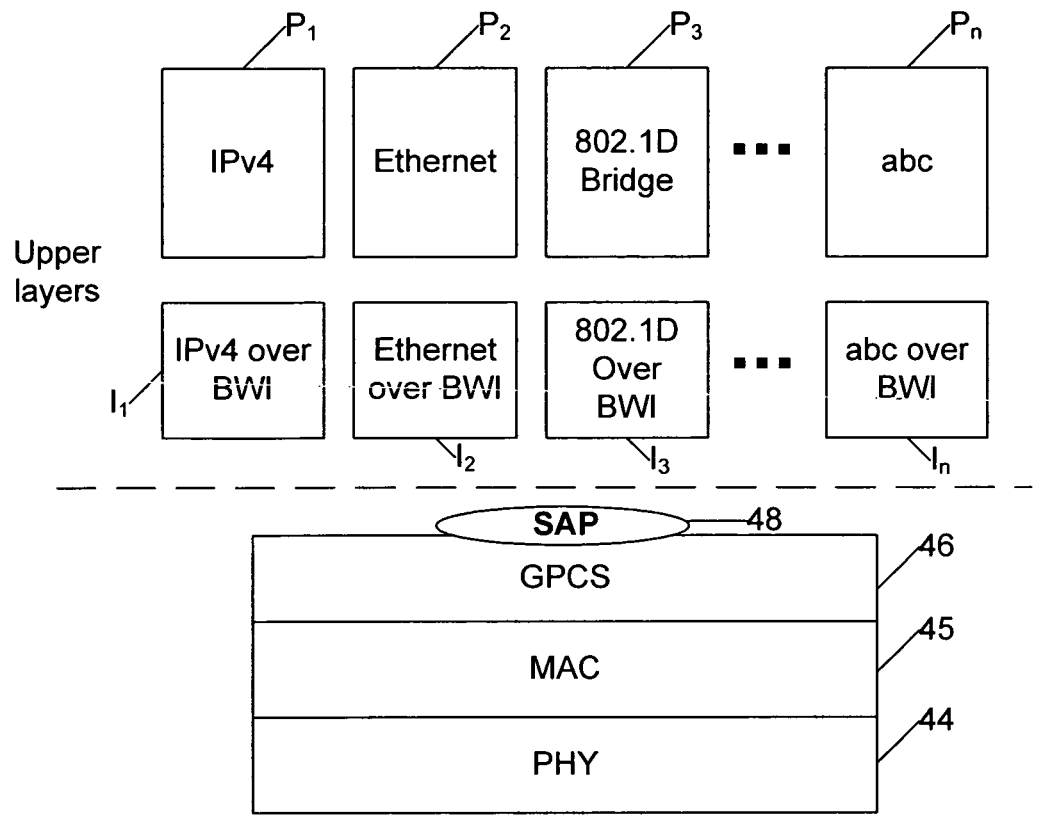
FIG. 3 is a block diagram of the layered interconnection modules of a base station and/or subscriber station according to an exemplary embodiment of the present disclosure.

FIG. 3 is a more detailed block diagram of the control system associated with an antenna subsystem of a base station or subscriber station using broadband wireless access such as the 802.16 IEEE wireless access standard. As illustrated, the system comprises a lower PHY (physical) layer module 44, a MAC layer module 45, and a generic packet convergence sublayer (GPCS) module 46 with a single service access point (SAP) 48 communicating with the upper layers. SAP 48 is not protocol specific. The upper layers comprise a plurality of different upper layer protocol modules $P_1, P_2, P_3 \ldots P_n$ each communicating with its own upper layer interface module $I_1, I_2, I_3 \ldots I_n$. The upper layer protocol modules $P_1, P_2, P_3 \ldots P_n$ correspond to the input/output traffic for the various types of communication protocols carried over the outside networks to and from the base station or subscriber station.

In FIG. 3, the protocol type IPv4 ($P_1$) has an associated IPv4 over BWA interface module $I_1$, protocol type Ethernet ($P_2$) has an associated Ethernet over BWA interface module $I_2$, protocol type 802.1D bridge $P_3$ has an associated 802.1D over BWA interface module $I_3$, and so on. These interface modules will be described in more detail below.

The PHY layer module 44 is configured to send and receive data packets over the BWA interface under the control of the MAC layer module 45. The PHY layer module 44 specifies the frequency band, the modulation scheme, error-correction techniques, synchronization between transmitter and receiver, data rate, and time-division multiplexing structure. The MAC layer module 45 functions include transmitting data in frames and controlling access to the shared wireless medium, and defining how and when a base station or subscriber station can initiate transmission in order to satisfy quality of service (QoS) demands. The PHY and MAC layer modules communicate over an interface or PHY SAP (service access point). A MAC SAP provides an interface between the GPCS module and the MAC module.

The interfaces $I_1, I_2, I_3 \ldots I_n$ carry out all necessary upper layer packet parsing and add the appropriate classification parameters, for example, source and/or destination addresses, port numbers, type of service or class of service information, protocol type, etc., to the packets which are passed to the GPCS 46 via GPCS SAP 48, enabling the base station or subscriber station to classify the service data unit (SDU). This enables data packets of multiple protocols/services to be transmitted through a single convergence layer. An advantage of this arrangement is that the wireless air interface protocol is more easily extendable to transport new protocols over the wireless air interface. The wireless air interface protocol definition does not need to be modified each time a new protocol is developed. Instead, each new protocol type in the upper layer can be provided with an upper layer interface module specification which could be developed by any standard body, without modifying the basic air interface MAC protocol and GPCS layer.

The GPCS allows the air interface MAC protocol to be de-coupled from the higher layer protocols. Instead of forcing the convergence sublayer to know about all the protocols it is likely to carry and possibly to repeat some of the higher layer protocol functions within the GPCS layer, the higher layer protocols simply pass a few parameters in the packets to enable the GPCS to classify each packet (or SDU).

Figure 4:
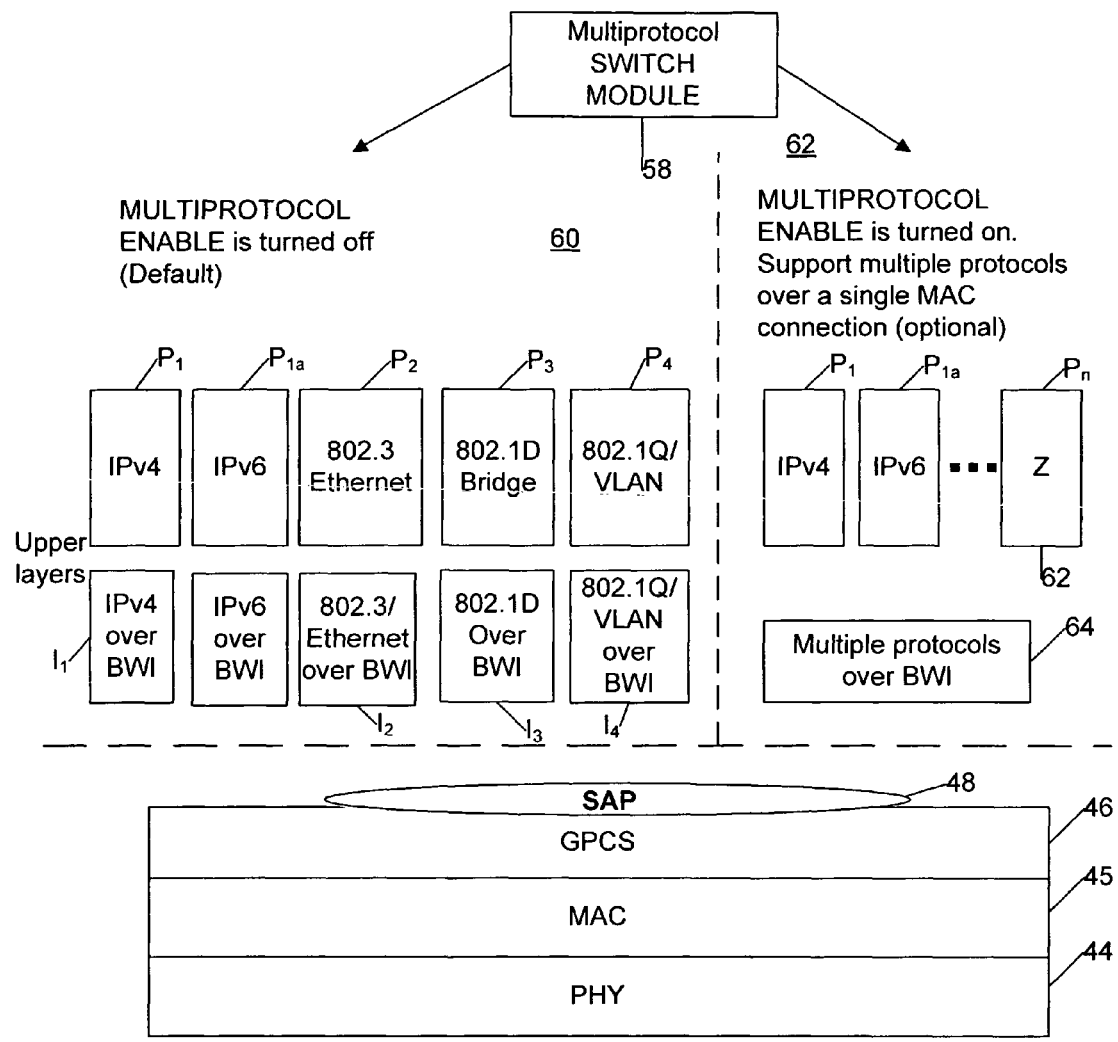
FIG. 4 is a diagram similar to FIG. 3 but illustrating a modified arrangement of the upper layer modules.

FIG. 4 illustrates a modified control system for a base station or subscriber station using a generic packet convergence or GPCS sublayer, in which a multiple protocol interface module 64 is provided in addition to the service specific interface modules $I_1, I_2, I_3 \ldots I_n$ of FIG. 3. A multi-protocol function or switch module 58 is provided to control activation of the multiple protocol option, preferably on a connection by connection basis but alternatively on a device by device or even system by system basis. The system of FIG. 4 is otherwise identical to that of FIG. 3 and has the same PHY layer 44, MAC layer 45 and GPCS layer 46, along with a single GPCS SAP 48 for communication with the upper layers.

The multiple protocol function of FIG. 4 can be enabled or disabled by a local system or on a connection by connection basis based on preference. The left hand portion 60 of the upper layers in FIG. 4 is used when the multiple protocol enable option is not activated, and this is the default condition which operates exactly the same as the system of FIG. 3. Like reference numbers have been used in FIG. 4 for the modules equivalent to those of FIG. 3, and reference is made to the description of FIG. 3 in connection with these like numbered modules.

Portion 60 of the upper layers in FIG. 4 has multiple, protocol specific interface modules $I_1, I_2, I_3 \ldots I_n$ each associated with a corresponding protocol or backhaul input/output port module $P_1, P_2, P_3 \ldots P_n$, such as IPv4 protocol $P_1$, IPv6 protocol $P_{1a}$, 802.3 Ethernet protocol $P_2$, and 802.1Q/VLAN (virtual local network) protocol $P_4$. Each protocol module is associated with a corresponding interface module IPv4 over BWI $I_1$, IPv6 over BWI $I_{1a}$, 802.3 Ethernet over BWI $I_2$ and 802.1Q/VLAN over BWI $I_4$. The broadband wireless interface (BWI) may be an IEEE 802.16 interface or the like. It will be understood that other protocols and associated interface modules may also be provided at the network station or node, depending on which networks or services are to be handled or accessed.

Operation of the system of FIG. 3 or the system of FIG. 4 when multi-protocol is not enabled is illustrated in more detail in FIGS. 8 and 9 below. Operation of the system. When multi-protocol is enabled is first described in connection with the right hand portion of the upper layers in FIG. 4 and with reference to FIGS. 6 and 7.

Figure 5A:
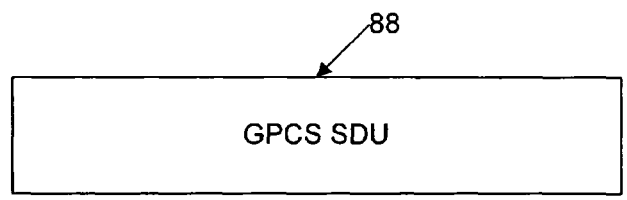
FIG. 5A illustrates the format of a service data unit ("SDU") in the generic packet convergence sublayer ("GPCS") of FIG. 4 if the multiprotocol enable is turned off.
Figure 5B:
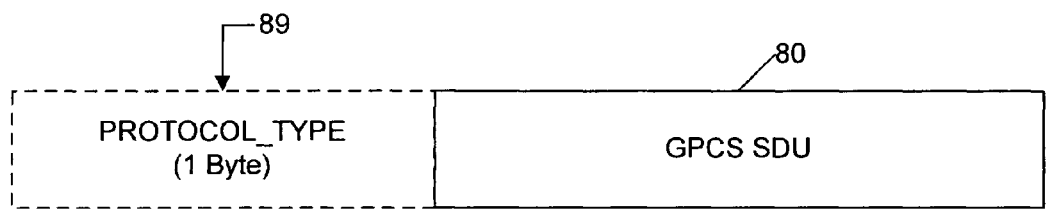
FIG. 5B illustrates the format of a service data unit ("SDU") in the generic packet convergence sublayer ("GPCS") of FIG. 4 if the multiprotocol enable is turned on (enabled)

FIG. 5A and 5B illustrate the differences between a GPCS SDU (88) when multiprotocol operation is disabled and a GPCS SDU (80) when multiprotocol operation is enabled. The GPCS SDU (80) when multiprotocol is enabled additionally comprises a Protocol Type identifier 89. One skilled in the art can see that the Protocol Type 89 can be added by either the GPCS or by the upper layers, depending upon the implementation of the system. Additionally, while a pre-pended byte is the preferred embodiment, other embodiments may include a smaller or larger number of bits the many be pre-pended, appended, or placed at a know location interior to GPCS PDU (80), such as in an IEEE 802.16 extended subheader.

Figure 6:
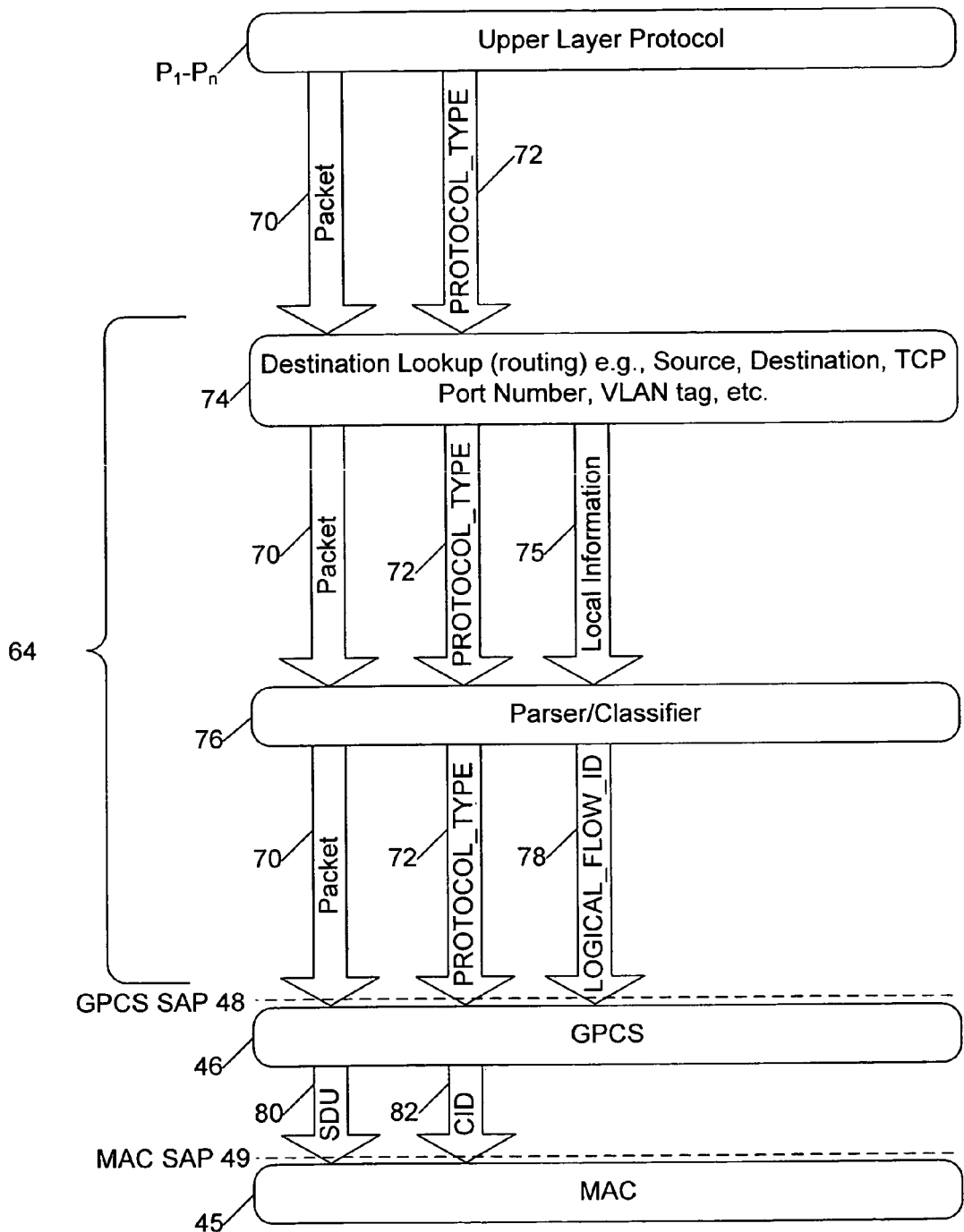
FIG. 6 is a flow diagram illustrating the functions carried out by the modules illustrated in FIG. 4 to transmit a data packet over a wireless air interface when multi-protocol enable is activated.

FIG. 6 is a flow diagram or parameter model illustrating the functions carried out by the system of FIG. 4 when the multiple protocol option is enabled. FIG. 6 illustrates the steps carried out when a data packet in any protocol is received at a network node such as a base station or subscriber station for transmission over a broadband wireless air interface (BWI) to a specific connection ID (or CID) at another node. This flow diagram also defines the GPCS SAP parameters for transfer of data from the upper layer to the GPCS, which is referred to as the GPCS DATA request in the following description.

In FIG. 6, a data packet 70 first arrives at the upper layer. The system "knows" the protocol type 72 of data packet 70 based on the specific input/output port module $P_1, P_2, P_3 \ldots P_n$ at which the packet is received. The data packet 70 and a protocol type indication tag 72 are transmitted by protocol input/output port module $P_n$ to a router or destination look-up module 74 of the multiple protocol interface 64. Various parameters in the packet can be utilized, in by the destination look-up module 74, such as the IP source address, IP destination address, transmission control protocol ("TCP") port number, VLAN tag, and the like, as a first stage of classification, to determine the destination of the packet and condense the result as local information 75 to a parser/classifier 76, along with the data packet 70 and protocol type indication tag 72. The destination is a selection of broadband wireless interface 32, wireless node on the opposite side of the air interface and could include an application identifier. Such information is embodied as local information 75, which is input to the next module, parser or classifier 76.

Parser or classifier 76 can employ various known forms of packet inspection, local information 75 to map the data packet to a logical flow. A logical flow (LOGICAL_FLOW_ID) 78 is a local representation of class of service (CoS). Logical flow ID 78, like local information 75, is a condensed representation of destination and CoS which the GPCS module 46 uses to determine the connection ID 82. The data packet 70 is then passed through the GPCS SAP 48 to the GPCS module 46, along with the protocol type identification 72, and an identification tag 78. In one embodiment, the logical flow identification is a locally assigned number (identifier) which is unique to the GPCS implementation and which can be mapped by the GPCS module directly to a connection ID (or service flow ID, SF ID, using IEEE 802.16 terminology) that is bound to a flow of packets on the air interface between base station and subscriber. This number also indicates the class of service assigned to the SF ID. If the network station is a base station, the LOGICAL_FLOW ID could be a logical path to a mobile subscriber station or a fixed subscriber station. If the network station is a subscriber station, the LOGICAL_FLOW ID could be a destination selector, where destination can be defined in many ways, for example a combination destination IP address, protocol type and port. The LOGICAL_FLOW_ID maps a data packet directly to exactly one connection ID (CID). The CID acts as a handle which can allow CoS, QoS parameters, and traffic parameters to be associated with the packets. For example, this may allow the two packets of the same CoS to be mapped to two different service level agreements giving them, for instance, different guaranteed or peak data rates.

On receipt of a data packet along with a protocol type identification and logical flow identification, the GPCS module maps the logical flow identification to the appropriate service flow identification (SFED) and associated CID for the data packet (see FIG. 7), and sends a service data unit (SDU) 80 and connection ID (CID) 82 to the MAC module 45 for scheduling of the SDU for transmission to the associated SF ID. The connection ID (CID) is a unique, mapping between MAC peers of two network nodes over a wireless air interface. The service data unit (SDU) 80 contains the data packet 70 and protocol type and is passed from the GPCS to the MAC layer 45 via the MAC SAP 49, along with the CID 82. FIG. 5B illustrates the format of the GPCS PDU 80 when multiprotocol is enabled.

The MAC module 42 schedules the SDU for transmission with a priority based on the associated QoS for the particular CID, using QoS module 43 (FIG. 2), and transmits the SDU in a protocol data unit (PDU) at the appropriate time over the wireless air interface to the MAC peer via the PHY layer module.

The control system of FIG. 6 enables the upper layer modules $P_1$-Pn 74 76 to specify the air interface services without the need for the GPCS module to interpret upper layer protocol headers, and without the need for MAC peers (base station and subscriber station) to agree on a set of parsing and classification rules. The parsing portion of the classification process is carried out in the upper layer modules, so that a single GPCS SAP can pass all data packets to the GPCS module, regardless of protocol type. The arrangement allows a wide variety of system configurations above the GPCS SAP that can be combined in various ways. Off-the-shelf components and subsystems can provide bridging, routing and parsing functions without adhering to a standard. The number of bits and numeric assignments is left to the implementation. All that is required is a look up table which directly maps the LOGICAL_FLOW_ID to exactly one wireless air interface connection ID (CID) at the packet destination address. In this embodiment, the LOGICAL_FLOW_ID is not communicated between MAC peers. It is a representation of the result of destination lookup 74 and parser/classifier 76 unique to the network station implementation.

FIG. 6 does not show where header compression is performed. Header compression may be performed separately from the convergence process. For example, a system implementing IPv4 with ROHC could implement header compression in the upper layers or a compressor engine could be inserted just below the "Parser/Classifier." Either configuration could result in an ROHC-interoperable system. Alternatively, the GPCS or the multiple protocol interface can perform that function. One skilled in the art can see that other header compression schemes can be accommodated by the control system of FIG. 6.

Also note that a system could define a null function for "Destination Lookup," "Parser/Classifier" and even "Generic Classifier." The upper layer modules in such a system provide direct access to the MAC SAP. For instance, a video-over-802.16 device need not define Ethernet or IP convergence function.

Figure 7:
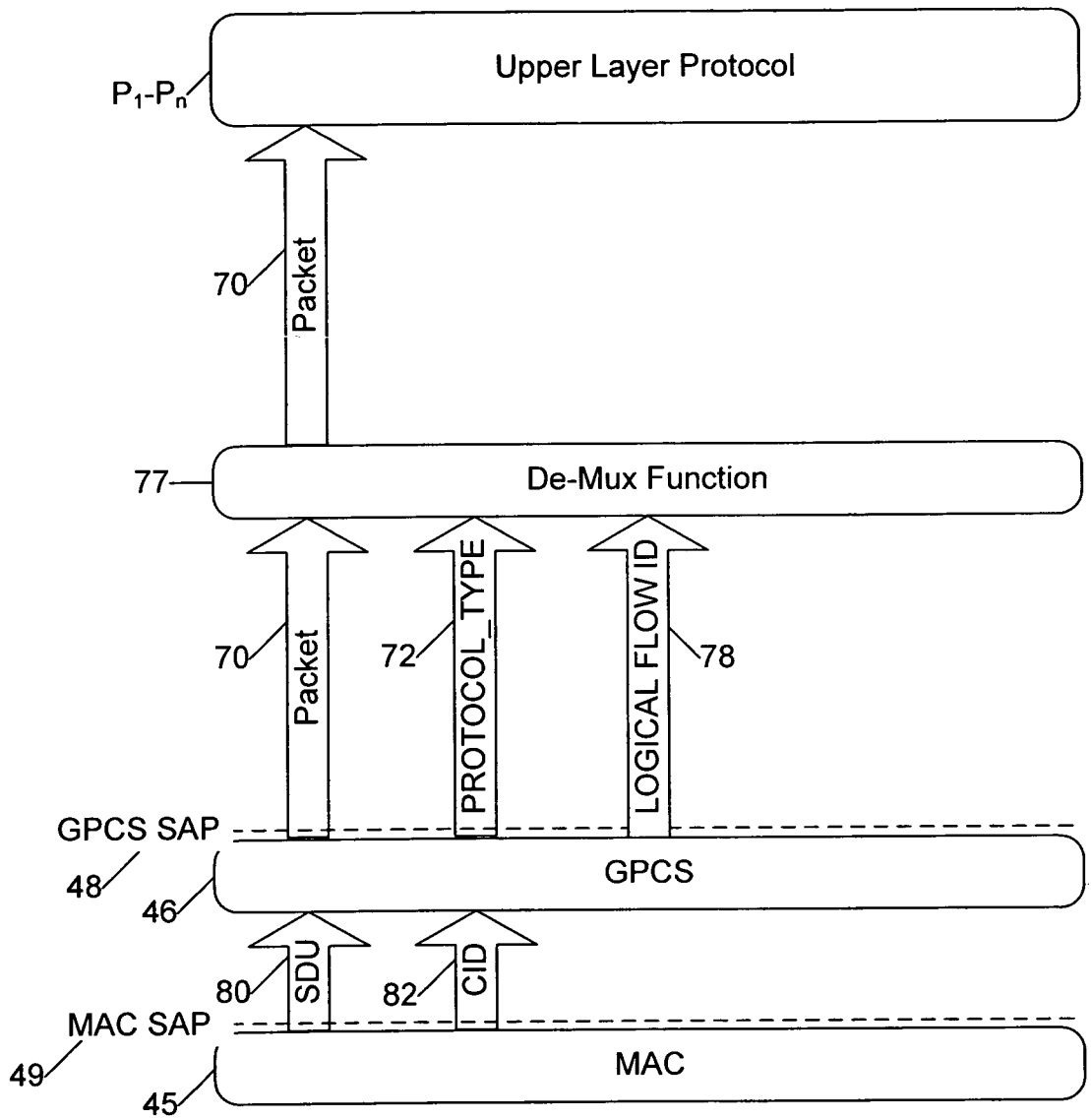
FIG. 7 is a flow diagram illustrating the fuinctions carried out by the modules illustrated in FIG. 4 on receipt of a data unit over a wireless air interface when multi-protocol enable is activated.

FIG. 7 is a flow diagram illustrating the functions carried out by the modules illustrated in FIG. 4 on receipt of a protocol data unit (PDU) over a wireless air interface when multi-protocol enable is activated. The MAC module extracts SDUs and CIDs from the PDU and transfers each SDU 80 and associated CID 82 to the GPCS module 46. The GPCS module finds and extracts the PROTOCOL TYPE from the packet data unit (PDU). The PROTOCOL TYPE may be located, for example, at byte number 0 of the PDU (see FIG. 5B). Alternatively, the PDU may have a multi-byte header, a trailer, or a known mid-packet byte(s) where the protocol type is located. The GPCS removes the PROTOCOL TYPE from the SDU before sending the resultant data packet 70 and protocol type identifier 72 to module 77 which carries out a de-multiplex function and looks up the upper level protocol port or module $P_1, P_2, P_3 \ldots P_n$ based on the received protocol type identifier 72. The data packet is then sent to the appropriate network input/output port $P_1, P_2, P_3 \ldots P_n$ for transmission over the backhaul to the corresponding network. If the receiving station is a subscriber station, the data packet is delivered to the desired destination at the subscriber station, such as a telephone, a computer, or the like. If the receiving station is a base station, the data packet is delivered over the associated outside network to the addressee server.

Figure 8:
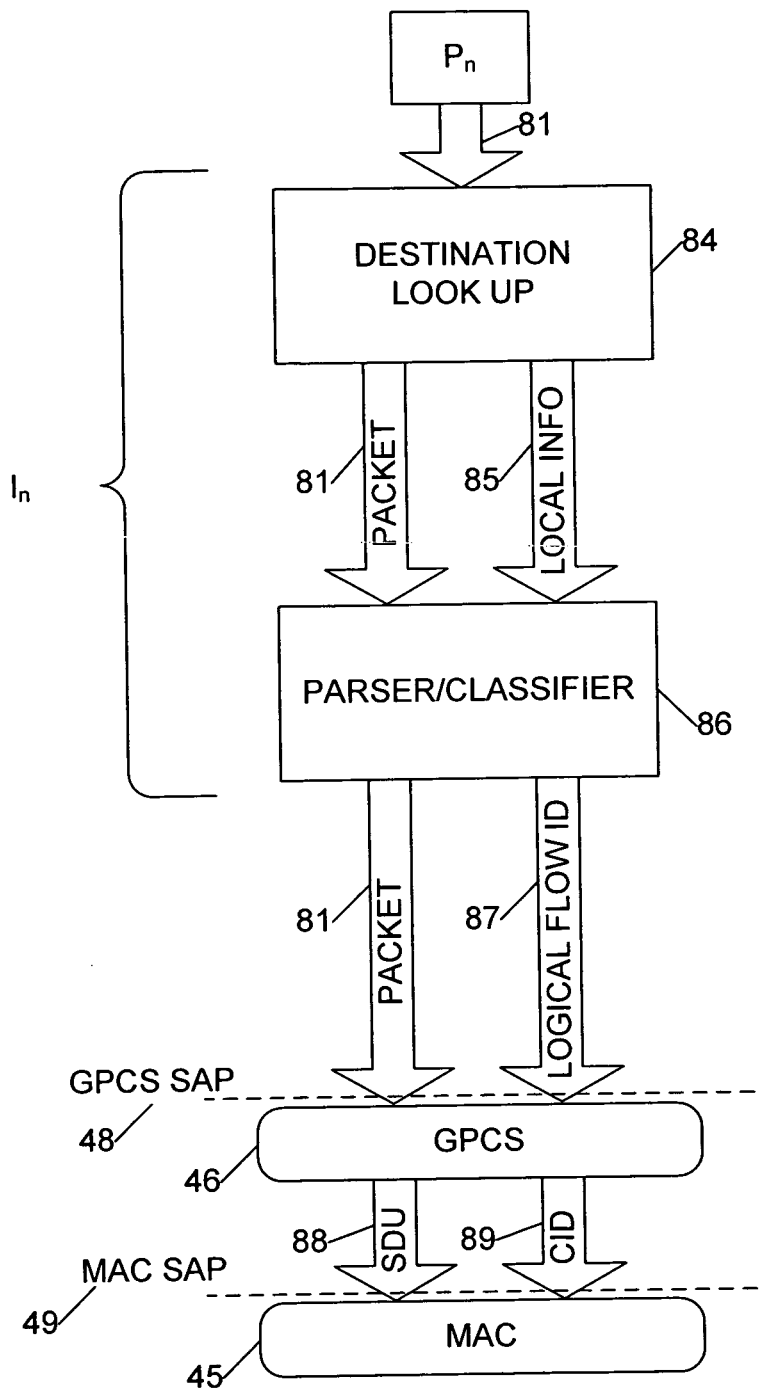
FIG. 8 is a flow diagram illustrating the functions carried out when a data packet is received by the upper layer of the network station of FIG. 3 or FIG. 4 when multi-protocol enable is not activated.
Figure 9:
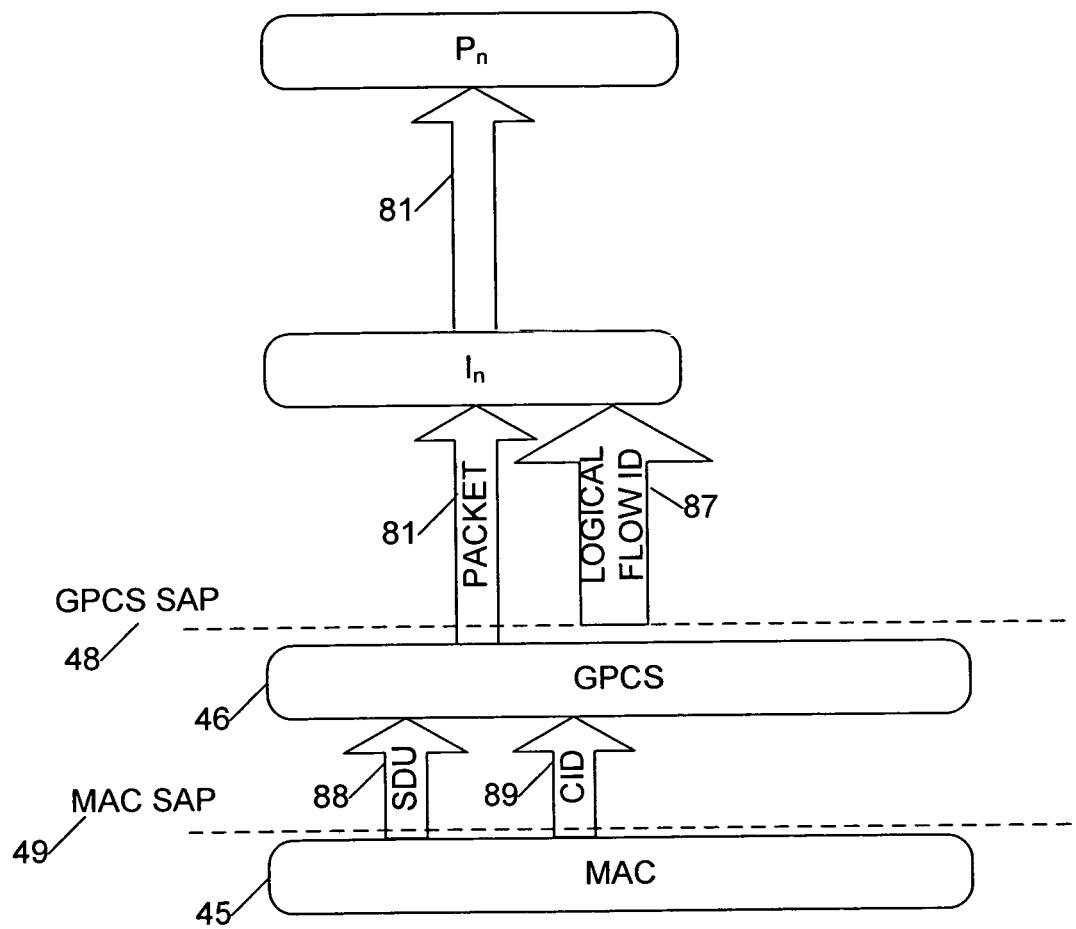
FIG. 9 is a flow diagram illustrating the functions carried out when a data packet transmitted over a broadband wireless air interface is received by the MAC module of a base station or subscriber station as illustrated in FIGS. 3 or 4 when multi-protocol enable is not activated.

FIGS. 8 and 9 illustrate the downlink or transmit and uplink or receive functions over a wireless air interface node if the multi-protocol enable function is not activated (e.g. the system of FIG. 3 or the left hand side option 60 of FIG. 4). If MULTIPROTOCOL_ENABLE is not activated, each different protocol data packet is passed to the GPCS SAP 48 via its own specific interface module $I_1$ to $I_n$. In this case, each air interface CID can carry only one protocol type. In the preferred embodiment, the protocol type for each connection CID is communicated during connection establishment, although for pre-provisioned services this could be accomplished prior to connection establishment. For instance, in IEEE 802.16 compliant systems, either method could be accomplished through Dynamic Service (DSx) messages, in particular the Dynamic Service Addition request (DSA-REQ) and response (DSA-RSP) messages. DSx messages in 802.16 compliant systems describe parameters using type, length and value (TLV), where in this case the value is a protocol number assigned to the specific protocol of the original data packet according to an established registry such as the Internet Assigned Numbers Authority (IANA) registry. A new IANA registry may be allocated for GPCS protocol numbers, which may be 8 or 16 bit numbers, for example.

The operation of the system on receiving a particular protocol $P_n$ data packet 81 is similar to the operation when multi-protocol is enabled, as in FIG. 6, except that there is no protocol type identification required. The interface module $I_n$ looks up the destination or routing from various parameters embedded in the packet using a destination look-up or routing module 84. These parameters may comprise the source, destination, transmission control protocol ("TCP") port number, VLAN tag, and the like. An address-based classification is then provided as local information 85 to a parser/classifier 86, along with the data packet 81.

As in the multi-protocol interface described in connection with FIG. 8, the parser or classifier 86 of the protocol specific interface $I_n$ employs any known form of packet inspection to map the data packet to a service type destination address, such as an IP entity, an Ethernet entity or other network entity at the service address to which the packet is addressed, and to determine the associated class of service (QoS) associated with the service destination address. The data packet 81 is then passed through the GPCS SAP 48 to the GPCS module 46, along with an identification tag 87 which combines the service destination address and class of service (QoS) information for the packet 81. The identification tag 87 is a logical flow identification (LOGICAL_FLOW_ID) which defines the routing and the class of service associated with the data packet. The logical flow identification is a locally assigned number which can be mapped by the GPCS module directly to a MAC layer connection ID of a wireless air interface service. For example, the LOGICAL_FLOW ID could be a combination of service flow ID and a subscriber ID which uniquely identify a logical path to the subscriber station with the associated QoS information.

The GPCS module knows the protocol of the data packet based on the interface In from which it is received (for instance, a protocol type tag may be passed with the packet), and uses that information along with the logical flow identification 87 to map the data packet to a particular connection ID (CID) of the broadband wireless interface (BWI), which is associated with a particular QoS and a particular route. The data packet is then sent as a service data unit (SDU) 88 along with the CID 89 to the MAC module 45. FIG. 5A illustrates the GPCS SDU format when multi-protocol operation is not enabled.

The MAC module schedules the SDU for transmission with a priority based on the associated QoS, using QoS module 43 (FIG. 2), and transmits the SDU in a protocol data unit (PDU) at the appropriate time over the wireless air interface to the MAC peer at the CID.

FIG. 9 illustrates receipt of a PDU at a network node or station via the wireless air interface when multi-protocol is not being used. It should be noted that multiprotocol may be on or off on a connection-by-connection basis, i.e. at the same network station, some connections may be using multiprotocol while others are not. FIGS. 8 and 9 illustrate the downlink or transmit and uplink or receive functions over a wireless air interface node if the multi-protocol enable function is not activated (e.g. the system of FIG. 3 or the left hand side option 60 of FIG. 4). If MULTIPROTOCOL_ENABLE is not activated for the particular connection, each different protocol data packet is passed from the GPCS SAP 48 to its own specific interface module $I_1$ to $I_n$. In this case, each air interface CID can carry only one protocol type. In the preferred embodiment, the protocol type for each connection CID is communicated during connection establishment, although for pre-provisioned services this could be accomplished prior to connection establishment. For instance, in IEEE 802.16 compliant systems, either method could be accomplished through Dynamic Service (DSx) messages, in particular the Dynamic Service Allocation request (DSA-REQ) and response (DSA-RSP) messages. DSx messages in 802.16 compliant systems describe parameters using type, length and value (TLV), where in this case the value is a protocol number assigned to the specific protocol of the original data packet according to an established registry such as the Internet Assigned Numbers Authority (IANA) registry. A new IANA registry may be allocated for GPCS protocol numbers, which may be 8 or 16 bit numbers, for example. In this case, the connection ID or CID is specific to the protocol of the data packet. The MAC module 45 extracts SDUs and CIDs from the PDU and transfers each SDU 88 and associated CID 89 to the GPCS module 46. In this case, unlike the multi-protocol enable situation of FIG. 7, the particular interface $I_n$ can be identified from the CID 89 and the GPCS therefore directs the data packet and also the associated Logical Flow identification tag to the appropriate protocol interface $I_n$, which transmits the packet in turn to the appropriate input/output port interface $P_n$ of the network station. Where the network station is a subscriber station, the port can be connected to a network device such as a telephone or computer. Where the network station is a base station, the port can be connected to an appropriate network connection of the backhaul for transmission to the designated network destination.

The GPCS SAP 48 includes two functions, a GPCS DATA request which defines the transfer of data packets from the upper layer interface module or modules to the GPCS SAP, and a GPCS DATA indication, which defines the transfer of SDUs received over the wireless air interface from the GPCS SAP to the upper layer interface module or modules. The GPCS DATA request is generated by the upper layer interface module or modules whenever a GPCS SDU is to be transferred to a peer entity or entities. The GPCS DATA request parameters provide the information for the GPCS to map the GPCS SDU to a MAC connection without the need to investigate the contents of the SDU. For example, the GPCS DATA request SAP parameters can include protocol type and logical flow ID, as described above in connection with FIGS. 6 and 8, as well as length and data. The logical flow ID enables the GPCS module to map the data packet to a previously established wireless air interface connection ID (CID). The length parameter specifies the length of the SDU in bytes. The data parameter specifies the SDU as received by the GPCS SAP from the upper layers.

The GPCS DATA indication function defines the transfer of data from the GPCS to an upper layer interface, as illustrated in FIGS. 7 and 9. The parameters of the GPCS DATA indication provide the information for the upper layer module to process the received GPCS SDU. For example, the GPCS DATA indication parameters can include logical flow ID, length, and data. The length parameter specifies the length of the SDU in bytes. The data parameter specifies the SDU as received by the GPCS SAP from the MAC. The logical flow ID parameter specifies the logical flow of the SDU, which is identified by the GPCS based on the connection ID provided by the MAC layer, because logical flow ID is not transferred over the wireless air interface in every MAC PDU.

Figure 10:
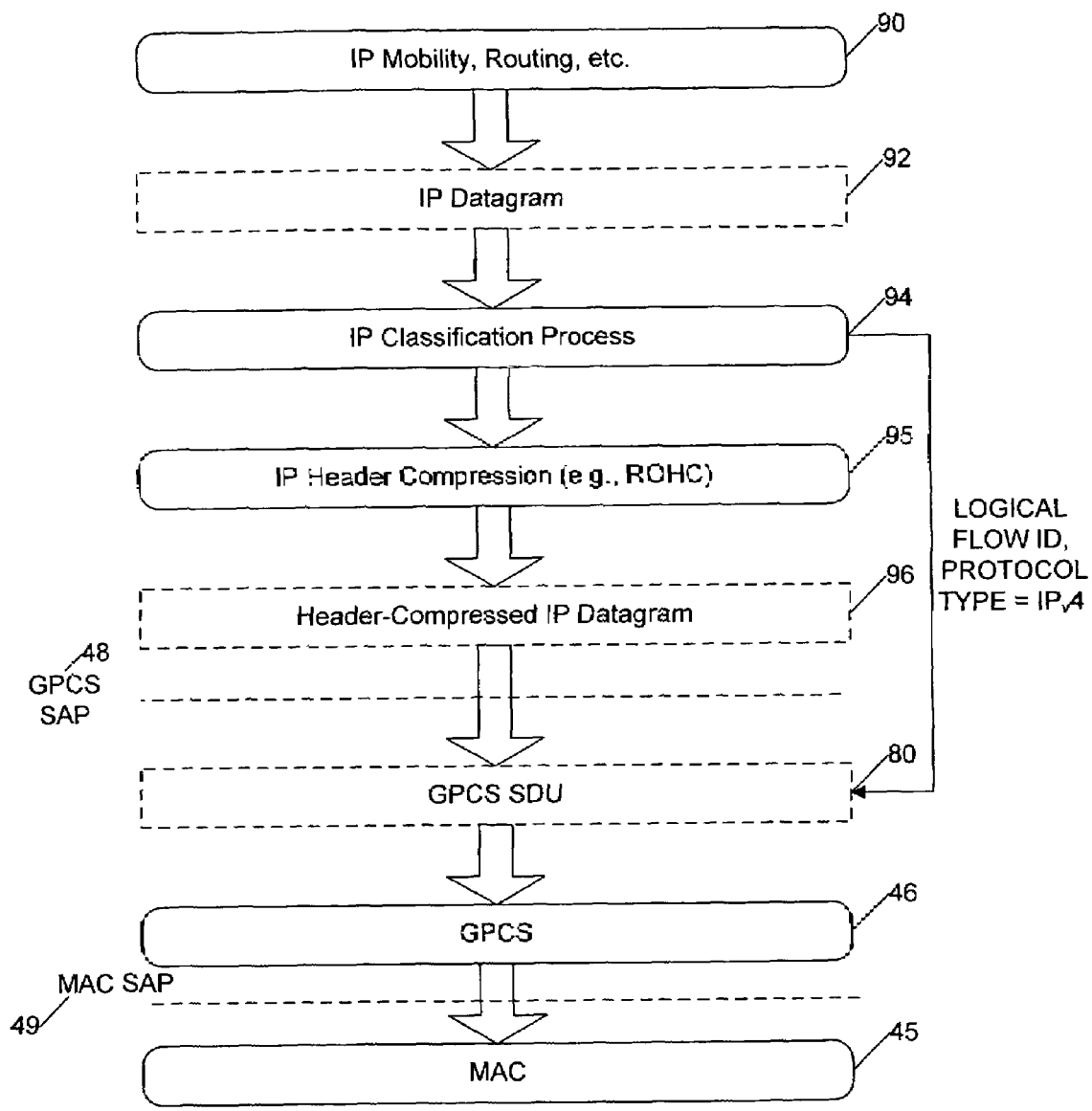
FIG. 10 is a flow diagram illustrating a local transmit process for IPv4-ROHC over a generic packet convergence sublayer as illustrated in FIG. 3 or 4.
Figure 11:
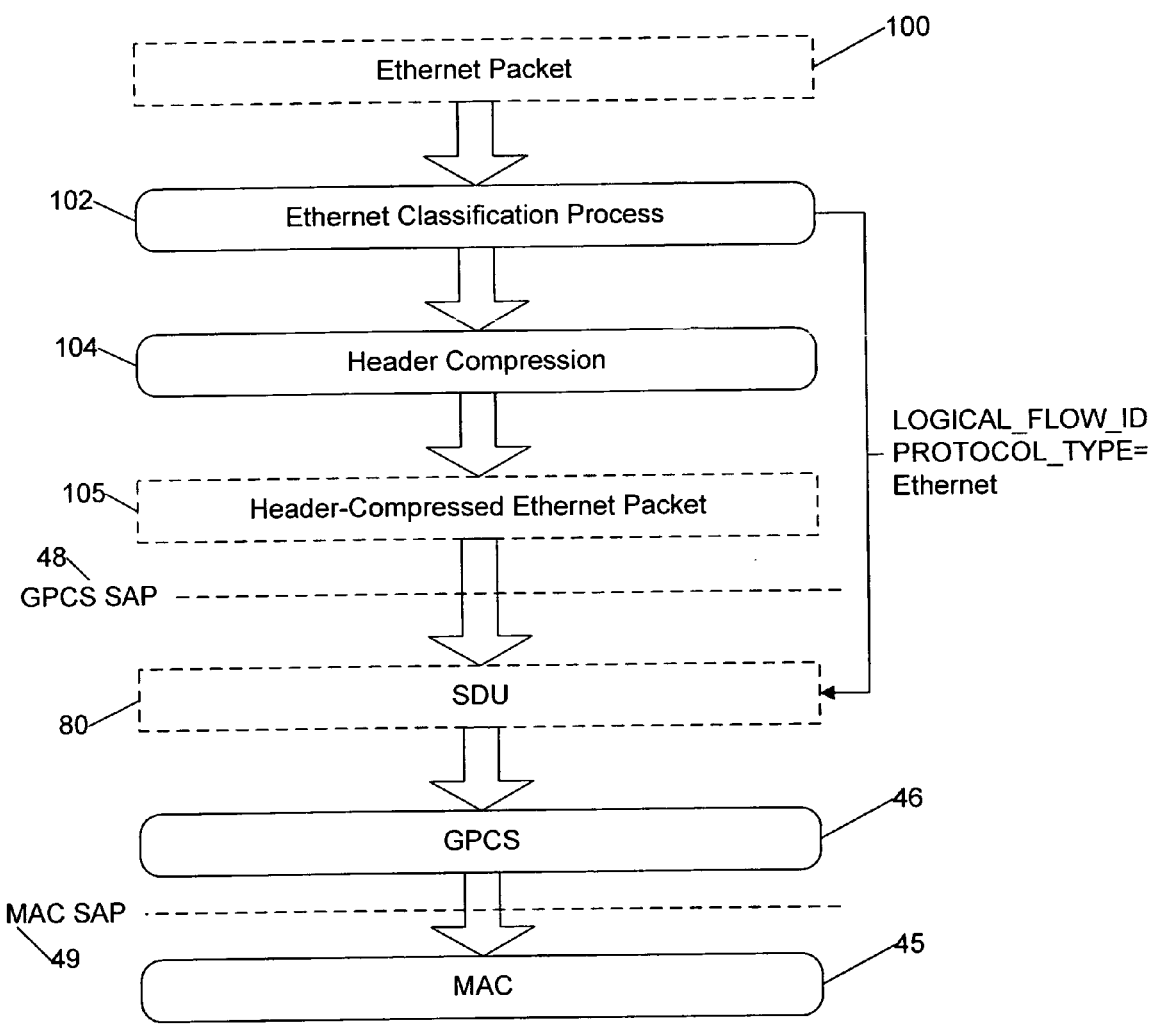
FIG. 11 is a flow diagram illustrating a local transmit process for Ethernet over a generic packet convergence sublayer as illustrated in FIG. 3 or 4.

FIGS. 10 and 11 illustrate some specific examples of how GPCS is used for two upper layer protocols of interest, specifically IPv4 with Robust Header Compression (ROHC) and Ethernet packets, respectively. FIG. 10 illustrates an example of a local air interface "stack" transmit process using the system of FIG. 3 or 4 to transmit IPv4-ROHC protocol data packets over GPCS. All of the protocol assignment steps above the GPCS SAP 48 in FIG. 10 are performed by the upper layers outside of the GPCS layer 46, and may be proprietary or may be specified by an "IP over 802.16" standard or the like, or by recommended practice. These steps comprise IP mobility and routing 90, an IP classification process 94 which maps IP addresses, type of service/differentiated services code point ("TOS/DSCP") field, and the like, and an EP header compression step 95, which may be ROHC. This results in a header compressed IP datagram 96 which is transferred to the GPCS SAP 48 as SDU 88.

The output of the route and address resolution in step 94 is a path to a network entity which is included in the logical flow ID of the SDU 88. An IP endpoint or router typically needs to map a destination IP address to an egress link and destination MAC address. For Ethernet, many systems have an IP route lookup process and address resolution process such as the well known address resolution protocol (ARP). A similar system can be used for broadband wireless air interfaces, such as 802.16. An 802.16 BS can implement an IP route process, along with SS discovery and ARP if necessary. Whatever the process, standards-based or proprietary, the output of route and address resolution is a path to a network entity. This path is included in the logical flow ID, which identifies a local path from the IP entity to the egress radio for a subscriber station, for example. The system may employ a separate routing function to help (even a separate, off-the-shelf, IP router subsystem which is not aware of the wireless air interface protocol), or can combine IP packet classification (parsing and inspection) with routing.

The parsing and inspection process in a typical implementation results in more information to embody in the logical flow ID, specifically class of service. A network entity may have different classes of service associated with different network services, such as Internet, phone, VoIP, television, and the like, and the parsing and inspection process can determine class of service and QoS for each particular protocol data packet at the destination address to which that packet is directed. The parsing and inspection step may involve parsing of single-IP headers, tunneled IP-in-IP headers (e.g., for IP mobility), and even combine network address translation functions. As with routing, standard off-the-shelf subsystems may be employed to choose an appropriate, locally-defined logical flow ID. The logical flow ID is used in the GPCS module 46 to map to a specific associated connection ID (CID) of the wireless air interface, as described above in connection with FIG. 6.

Header compression can be performed anywhere above the GPCS SAP 48. In FIG. 10 it is shown last, which may make sense for some systems that translate headers during the packet inspection process. Robust Header Compression (ROHC) (see IETF Request for comments "RFC" 3095) can use GPCS. It should have its own protocol type, such as IPv4-ROHC so a receiver can "know" to apply the ROHC algorithm. Other header compression techniques can also be used, such as the "original" Van Jacobsen TCP/IP header compression, in IETF RFC1144.

FIG. 11 illustrates an example of a local air interface "stack" transmit process using the system of FIG. 3 or 4 to transmit Ethernet protocol data packets over GPCS. As in FIG. 10, all of the protocol assignment steps above the GPCS SAP 48 in FIG. 11 are performed by the upper layers outside of the GPCS layer 46, and may be proprietary or may be specified by an "Ethernet over wireless air interface" standard or the like, or by recommended practice. The received Ethernet packet 100 first goes through an Ethernet classification process 102, which maps Ethernet addresses and/or 802.1Q P bits, VLAN tag, and the like. This assigns the LOGICAL FLOW ID to the packet and also a PROTOCOL_TYPE=Ethernet at a selected location in the PDU if multi-protocol enable is activated. A header compression step 104 is then carried out, and the resultant header-compressed Ethernet packet 105 is transferred over the GPCS SAP 48 to the GPCS module. The GPCS module uses the logical flow ID to map the data packet to a specific broadband wireless air interface connection ID (CID), as described above in connection with FIG. 6.

FIG. 12 is a high level diagram, similar to FIG. 1, which shows service flows between a base station and subscriber station, each identified by a connection ID (CID). Each service flow has a set of quality of service, scheduling service type, and other delivery attributes. In the figure, service flows labeled as 200, 201 and 202 each have a CID. The service flows share the same broadband wireless air interface but have different parameters.

The above embodiments allow a wireless interface link layer of a network node, such as an 802.16 link layer, to be de-coupled from the higher layer protocols. This means that new multiple upper protocol data can be transmitted over a broadband wireless air interface without requiring any modification of the basic wireless air interface protocol.

Those of skill in the art will appreciate that the various illustrative protocol stack layers, modules, and method steps described in connection with the above described figures and the embodiments disclosed herein can often be implemented as electronic hardware, computer software, or combinations of both. To clearly illustrate this interchangeability of hardware and software, various illustrative layers, modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a layer, module, block, or step is for ease of description. Specific functions or steps can be moved from one module, block or step to another without departing from the present disclosure.

Moreover, the various illustrative protocol layers, logical blocks, modules, and methods described in connection with the embodiments disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for use in wireless communication, the method comprising:
   a generic packet convergence sublayer (GPCS) module receiving a data packet, wherein the data packet is of a first protocol type of a plurality of protocol types that the GPCS module is capable of processing, wherein the data packet comprises a header portion and a payload portion, and wherein the header portion of the data packet does not include an indication of the first protocol type;
   the GPCS module receiving a protocol type tag indicative of the first protocol type associated with the data packet, wherein the protocol type tag is not received in the data packet;
   the GPCS module receiving a logical flow identifier associated with the data packet and the first protocol type of the data packet; and
   the GPCS module mapping the logical flow identifier to a connection identifier (CID), wherein the CID is associated with a predetermined quality of service (QoS), and transmitting the data packet with the CID to a medium access control (MAC) protocol module for scheduling based on the CID.

2. The method as claimed in claim 1, wherein the logical flow identifier indicates a class of service (CoS) associated with the data packet and provides information about a destination of the data packet.

3. The method as claimed in claim 1, wherein the GPCS module receives the data packet and the logical flow identifier through a single non-protocol specific GPCS service access point ("SAP").

4. The method as claimed in claim 1, wherein the method is implemented in a base station.

5. The method as claimed in claim 4, wherein the logical flow identifier comprises a logical path to a subscriber station.

6. The method as claimed in claim 1, wherein the method is implemented in a subscriber station.

7. The method as claimed in claim 6, wherein the logical flow identifier comprises a destination selector.

8. The method as claimed in claim 7, wherein the destination selector comprises a combination of a destination address, protocol type, and port identifier.

9. The method as claimed in claim 1, wherein the protocol type tag indicates an IPv4 protocol, an IPv6 protocol, an IEEE 802.3 ethernet protocol, an IEEE 802.1D bridge protocol, or an IEEE 802.1Q VLAN protocol.

10. The method as claimed in claim 1, wherein the protocol type tag indicates a protocol other than Internet protocol (IP).

11. A network station comprising:
   a generic packet convergence sublayer (GPCS) module configured to:
      receive a data packet, wherein the data packet is of a first protocol type of a plurality of protocol types that the GPCS module is capable of processing, wherein the data packet comprises a header portion and a payload portion, and wherein the header portion of the data packet does not include an indication of the first protocol type;
      receive a protocol type tag indicative of the first protocol type associated with the data packet, wherein the protocol type tag is not received in the data packet;

receive a flow identifier representative of service specific information associated with the data packet and the first protocol type;

convert the data packet into a service data unit (SDU);

map information provided by the flow identifier to a connection identifier (CID), wherein the CID is associated with a predetermined quality of service (QoS); and transmit the SDU to a medium access control (MAC) module for scheduling based on the CID.

12. The network station as claimed in claim 11, further comprising:

a plurality of service specific interface modules configured to process data packets of a respective one of the plurality of protocol types.

13. The network station as claimed in claim 12, wherein the plurality of service specific interface modules include an Internet protocol (IP) over broadband wireless air interface module and an Ethernet over broadband wireless air interface module.

14. The network station as claimed in claim 11, wherein the service specific information indicates a plurality of parameters characterizing the data packet.

15. The network station as claimed in claim 14, wherein the plurality of parameters comprise at least information about a destination of the data packet associated with the flow identifier and a class of service (CoS).

16. The network station as claimed in claim 11, wherein the CID associates class of service (CoS), quality of service (QoS) and traffic parameters with the respective data packet.

17. The network station as claimed in claim 11, further comprising:

a memory configured to store a table associating each logical flow identifier with a CID corresponding to the flow identifier.

18. The network station as claimed in claim 11, wherein the network station is a base station.

19. The network station as claimed in claim 11, wherein the network station is a subscriber station.

20. The network station as claimed in claim 11, wherein the protocol type tag indicates an IPv4 protocol, an IPv6 protocol, an IEEE 802.3 ethernet protocol, an IEEE 802.1D bridge protocol, or an IEEE 802.1Q VLAN protocol.

21. The network station as claimed in claim 11, wherein the protocol type tag indicates a protocol other than Internet protocol (IP).

* * * * *